United States Patent [19]
Geiszler et al.

[11] Patent Number: 5,099,227
[45] Date of Patent: Mar. 24, 1992

[54] PROXIMITY DETECTING APPARATUS

[75] Inventors: Theodore D. Geiszler, Los Gatos; Dale Lindseth, San Martin, both of Calif.

[73] Assignee: Indala Corporation, San Jose, Calif.

[21] Appl. No.: 453,271

[22] Filed: Dec. 18, 1989

Related U.S. Application Data

[63] Continuation-in-part of Ser. No. 381,087, Jul. 18, 1989, abandoned.

[51] Int. Cl.⁵ .............................................. G08B 13/14
[52] U.S. Cl. ..................................... 340/572; 235/440
[58] Field of Search ........... 340/572, 505, 522, 825.54; 235/440, 379–380

[56] References Cited

U.S. PATENT DOCUMENTS 3,707,711  12/1972  Cole et al. ........................... 340/572
3,895,368  7/1975  Gordon et al. ...................... 340/572
4,818,855  4/1989  Mongeon et al. .................... 235/440

Primary Examiner—Glen R. Swann, III
Assistant Examiner—Thomas J. Mullen, Jr.
Attorney, Agent, or Firm—Spencer & Frank

[57] ABSTRACT

A proximity detection system which combines the advantages of an electrostatic (electric) field coupling mechanism with those of an electromagnetic coupling mechanism in order to overcome the disadvantages of the respective individual coupling mechanisms. The system includes a coded tag which is excited with an induction field, i.e., by using an electromagnetic coupling mechanism as has been done in the past in such proximity identification systems, but which transmits stored data back to the receiver using both an electric field coupling mechanism and an electromagnetic field coupling mechanism. The receiver, in turn, is provided with a novel preamplifier circuit arrangement, so that it can simultaneously receive signals via either or both of these coupling mechanisms.

25 Claims, 7 Drawing Sheets

PROXIMITY DETECTING APPARATUS

CROSS REFERENCE TO RELATED APPLICATION

This application is a Continuation-In-Part of the inventors U.S. application Ser. No. 07/381,087, filed Jul. 18th, 1989, now abandoned.

BACKGROUND OF THE INVENTION

The present invention relates to an identification system composed of a proximity powered and coded portable device or unit and a corresponding energization and interrogation device which generally has a fixed installation. The portable unit may be in the form of a tag or card, and for convenience is sometime referred to herein as a tag or transponder. The present invention thus relates to a system wherein a fixed installation sends out energy to activate a portable responsive device which would ordinarily be carried by a movable person or thing and which is in the vicinity or proximity of the fixed installation, and the device so energized sends out a coded signal to be picked up by a receiver. The receiver in turn, activates some system functions, for example, to provide access to a controlled area, to keep track of the movable person or thing, or to perform similar purposes.

Proximity identification technology systems are becoming a well known and important means of identification by which coded tags are read using a non-contact means of communication. A proximity identification system consists of four major components: a tag, which when excited, transmits stored identifying data, an exciter which transmits a signal to the tag to activate same, a signal receiver for detecting and decoding data transmitted by the tag, and a coupling mechanism by which the activating or exciting signal is transmitted to the tag and the stored data is transmitted to the receiver.

In the known proximity identification systems, power for the tag is generally provided by the activating signal which, by means of an electromagnetic coupling mechanism, transmits sufficient energy to the tag to supply power for its operation. However, various different coupling mechanisms by which data is transmitted back to the receiver are utilized. One of the more common coupling mechanisms for data transmission uses low frequency magnetic coupling. A more recently introduced technology of paramount importance uses an electric field coupling mechanism for data transfer. In this later coupling mechanism, the frequency of operation is likewise low, in the sense that a wavelength is much longer than the physical dimensions of the radiating structure(s). Due to this low frequency of operation, quasistatic or near field conditions exist.

As indicated above, the most common type of proximity identification system utilizes an electromagnetic coupling mechanism for both the exciting (power) signal and the data signal, with the data transmission frequency being a subharmonic or submultiple of the exciter frequency to provide isolation between the two signals. The use of such a coupling mechanism provides a number of advantages and disadvantages.

The advantages of electromagnetic coupling are as follows:

1. The coupling mechanism between the tag and the receiver is inductive in nature, arising from mutual coupling between the two, and the source impedance in the near field is very low. Thus, there is no appreciable shielding of the coupled signal due to conductive objects such as would be caused by covering the face of the tag with, for example, the hand of the user while introducing the tag into the exciter field; and
2. There is negligible reduction in range when the tag has no nearby ground reference.

This coupling method is very attractive in applications where the tag is to be placed on or in close proximity to shielding bodies, or such as when the receiver loop or antenna is to be buried for sensing vehicles, so that it is subjected to various ground conditions as well as rain, mud, etc.

The main disadvantages of electromagnetic field coupling are as follows:

1. Substantial power is required to transmit the coded information back to the fixed receiver.
2. The magnetic field, and thus the received signal, drops off as the cube of the distance from the source.
3. The data signal transmitted from the tag to the receiver is coupled by the same mechanism used to couple the exciter signal to the tag (magnetic), which brings about a difficulty due to the direct or harmonic relationship between the data signal and the exciting (powering) signal resulting in difficulty in extracting the much weaker information signal from the excitation signal.

The disadvantages of the above mentioned proximity identification system using only electromagnetic field coupling are substantially overcome and additional advantages provided by a system such as disclosed in commonly assigned U.S. Pat. No. 4,818,855 issued Apr. 4th, 1989 which, while using electromagnetic coupling for transmission of the exciter (power) signal, transmits the coded information back to the fixed receiver via an electric field coupling mechanism. The most important advantage of this system is the provision of different coupling modes or mechanisms for the signal transmitting power, and the much weaker return coded signal, thus providing isolation between the two signals. Additional isolation between the two signals can be achieved by transmitting the coded information at a subharmonic of the frequency used to transmit the power. Additional advantages are as follows:

1. Negligible power is required to retransmit the coded information from the tag to the receiver.
2. The electric field coupling antenna is small and easily integrated onto a small surface such as a card, causing this coupling mechanism to be more practical in terms of cost, simplicity, and increased reliability as opposed to an electromagnetic coupling mechanism.
3. The received signal drops off as the square of the distance from the source, as opposed to the cube of the distance realized with electromagnetic coupling.

On the other hand, the disadvantages of electric field coupling are as follows:

1. It is more important for the body or object bearing the tag to be physically connected to the tag for a good read range (body being referenced to ground potential), since doing so increases the capacitive coupling between the tag and the receiver due to the direct coupling path in one direction through the body in question with respect to ground reference.

2. The coupling mechanism from the tag to the receiver, being capacitive in nature and of a high impedance in the near field, is easily shielded by nearby grounded and conductive objects, such as when the front face of the tag (card) is covered with the hand of the user while introducing the tag into the exciter field.

SUMMARY OF THE INVENTION

It is the basic object of the present invention to provide a proximity detection system which combines the advantages of an electrostatic (electric) field coupling mechanism with those of an electromagnetic (magnetic) coupling mechanism in order to overcome the disadvantages of the respective individual coupling mechanisms. In general, this object is achieved according to the invention by utilizing a coded tag which is excited with an induction field, i.e., by using an electromagnetic coupling mechanism as has been done in the past in such proximity identification systems, but by transmitting the stored data back to the receiver using both an electric field coupling mechanism and an electromagnetic field coupling mechanism. The receiver in turn is provided with a novel preamplifier circuit arrangement, so that it can simultaneously receive signals via either or both of these coupling mechanisms.

More specifically, the above object is achieved according to the present invention by a remotely powered batteryless portable device (tag) having circuitry for storing and transmitting coded information which comprises: a memory in which coded information is stored; electromagnetic coupling means for receiving electromagnetic radiation, particularly magnetic radiation of a first predetermined frequency; power means connected to the first coupling means for deriving power from the received signal for use by the circuitry in the portable device; circuit means, connected to the first coupling means and responsive to a received signal of the first predetermined frequency, for reading the coded information from the memory; means for generating a carrier signal of a second predetermined frequency; modulating means for modulating the carrier signal with the coded information read from the memory; electrostatic coupling means, connected to the output of the modulating means, for transmitting the modulated carrier signal via an electric field; and further means, connected to the output of the modulating means, for simultaneously causing the modulated carrier signal to be electromagnetically (magnetically) transmitted.

According to one embodiment of the invention, the further means comprises a further electromagnetic coupling means which comprises a resonant circuit, including a coil which serves as an antenna, which is tuned to the second predetermined frequency; and the electrostatic coupling means comprises an electric field antenna connected to the high side of the coil.

According to a further embodiment of the invention, the further means comprises means for coupling the output of the modulating means to the coil of the electromagnetic coupling means for receiving the first frequency signal to cause that electromagnetic coupling means to electromagnetically transmit the modulated carrier wave. According to various modifications of this embodiment, the coupling means may be by of a small capacitor, an MOS transistor, or a similar type network such as a resistor.

According to further features of the invention, in order for better isolation between the components of the two frequency signals, the carrier signal frequency for data transmission is a sub-multiple, preferably one half, of the first exciter frequency, and in the embodiment where two electromagnetic coupling arrangements are provided, the respective coil antennas are orthogonally arranged for best isolation.

According to still a further feature of the invention, the receiver for detecting the transmitted modulated electromagnetic and electrostatic radiation includes an electromagnetic radiation receiving antenna, an electric field receiving antenna, and a novel common preamplifier circuit for detecting radiation received by the electromagnetic radiation and the electric field receiving antennas.

DETAILED DESCRIPTION OF THE PREFERRED EMBODIMENTS

Figure 1:
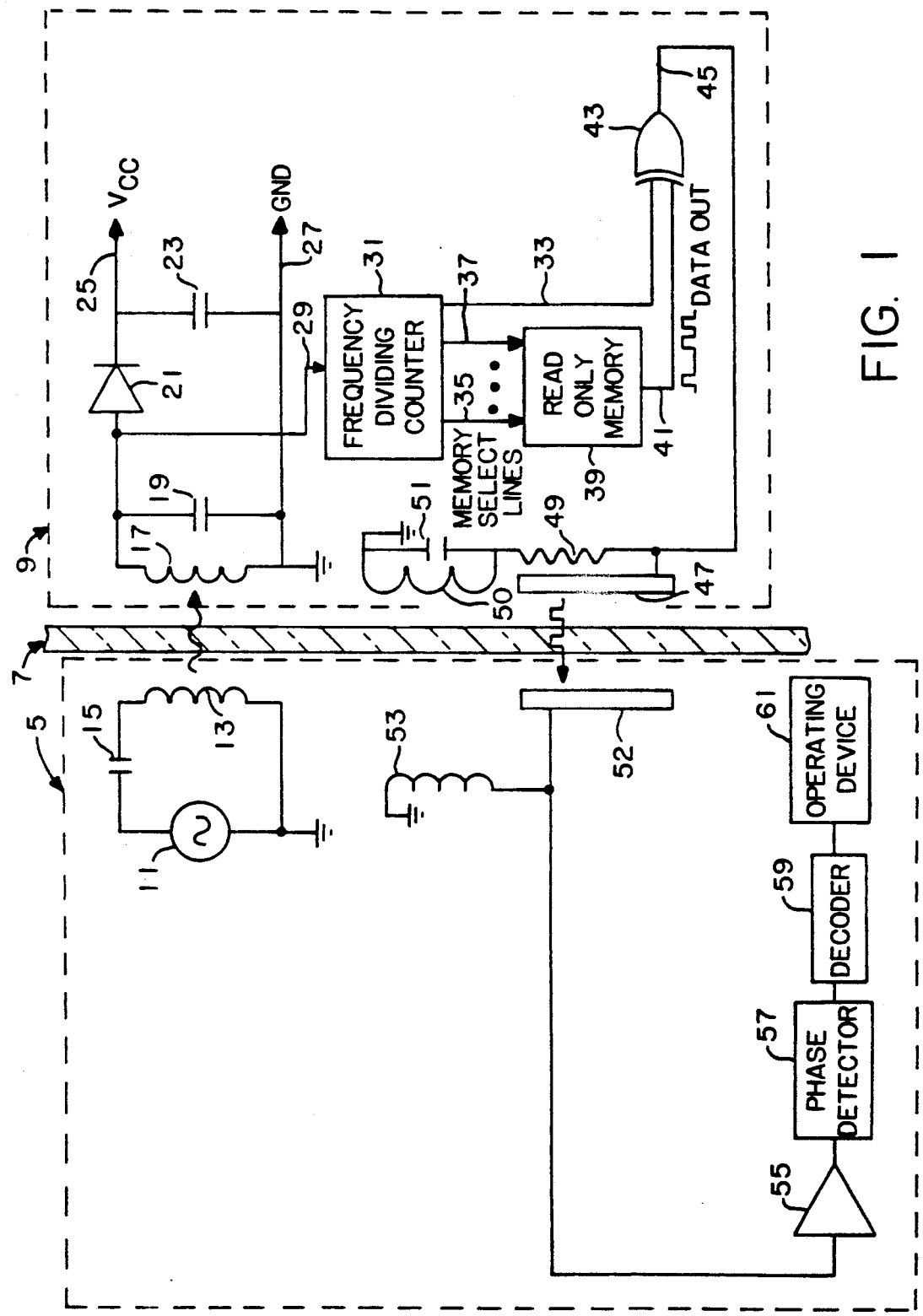
FIG. 1 is a block circuit diagram of one embodiment of a proximity identification system according to the invention.

Referring now to FIG. 1 there is shown a proximity identification according to the present invention wherein reference numeral 5 designates the circuitry of a fixed installation mounted on a convenient structure 7, for example, a wall, a window, a floor or ground, etc. The remainder of the circuitry shown in FIG. 1 is contained on a portable unit, e.g. a card or tag which, for example, is disposed on a person, animal, vehicle, etc. so that it can be brought into proximity of the fixed installation for detection.

The exciter circuit, which likewise functions as a power supply, consists of an oscillator 11, which puts out power at a convenient frequency such as 400 kHz, and which is connected to a transmit coil antenna 13 tuned to resonate at the output frequency of oscillator 11 by means of capacitor 15. Coil 13 emits a strong electromagnetic (magnetic) field and is optionally provided with a Faraday shield to avoid capacitive or electrostatic coupling to the tag receiver.

The tag 9 includes a receive antenna or coil 17 and a parallelly connected capacitor 19 which form a tuned LC circuit which is resonant at the frequency f0 of the oscillator 11. A half wave rectifier circuit 21 and a filter capacitor 23 which are connected to antenna coil 17 and capacitor 19, provide power for the remaining circuitry of the tag 9 through lines 25 and 27, the connections of which are not shown for simplicity. The high side of the receiving coil antenna 17 is connected via a line 29 to the input of a frequency dividing counter 31 as a clock signal fO. The frequency dividing counter 31 produces an R.F. signal of frequency fO/2 on line 33 and address signals on a plurality of memory select lines, only two of which have been shown at 35 and 37, for activating a read only memory 39, which provides a plurality of coded pulses on an output line 41. Lines 33 and 41 are connected to respective inputs of exclusive OR-gate 43 which produces output pulses on a line 45 which are fed to an electrostatic antenna 47 which may, for example, be a capacitor plate or a length of wire. The coded pulses on line 41 occur at a much lower rate than the signal of frequency fO/2 on line 33. The effect of exclusive OR-gate 43 is to phase modulate the signal on line 33, which serves as a carrier frequency signal, with the coded pulse train on line 41, as described in greater detail in the above identified U.S. Pat. No. 4,818,455, the subject matter of which is incorporated herein by reference.

According to this embodiment of the present invention, the line 45 is likewise connected via a resistor 49 to the high side of an electromagnetic transmitting antenna coil 50 which is connected in parallel with a capacitor 51 to form a tank circuit tuned to resonate at the carrier frequency, which in the illustrated embodiment is fO/2 or 200 kHz. Typical values for this additional electromagnetic (magnetic) transmitting antenna arrangement for resonance at 200 kHz are 8.2 K$\Omega$ for resistor 49, 570 $\mu$h for coil 50 and 1100 pf for capacitor 51. With this arrangement, the coded data on line 45 is coupled to the tank circuit 50-51 via the series resistor 49 which also sets the Q of the tank circuit. The bandwidth is chosen such as to just pass the modulated data stream without attenuation. It is desirable to have as high a Q as possible without attenuating the data stream, because this raises the impedance of the tank circuit, thus reducing power consumption which is important since the tag 9 is powered from the limited induction field of the exciter.

In order to maximize the impedance of the tuned (tank) circuit 50-51, the transmit coil 50 preferably is wound on a ferrite rod, which simultaneously increases the flux generated by the transmit coil. At the transmit frequency, there is a resonance rise in the current circulating in the tuned circuit 50-51 which intensifies the electromagnetic field lines.

While the tank circuit 50-51 forms a closed loop for current flow, which is essential for generation of electromagnetic flux, the impedance at the high end of the coil 50 is large, being Q times the reactance of the loop or coil at the operating frequency. Thus, a large voltage (approximately equal to the peak to peak value of the input data signal) appears at the high end of the coil 50. Accordingly, for this reason, the electrostatic field antenna 47 can be attached to the coil 50 at its high end, or alternatively directly at the data transmit output terminal 45. That is, due to the high impedance of the output tank circuit 50-51 at resonance, the required electric field component is very effectively coupled to the outside world through the electrostatic field antenna 47.

The signals from the electrostatic antenna 47 and from the electromagnetic antenna 50 are picked up respectively at the fixed installation by a receiving electrostatic antenna 52, and a receiving electromagnetic antenna or coil 53, which are connected to the input of a common preamplifier circuit 55, which will be discussed in detail below. The output signals from the preamplifier 55 are detected by a phase detector 57 and passed to a decoder 59 for validation in a manner well known in the art. Assuming that the correct coded signal has been detected, an operating device 61 is then triggered. Operating device 61 might take many forms, such as a security device for admitting one to a secure area, a device for recording the location of the person or object carrying the tag, and the like.

Figure 2:
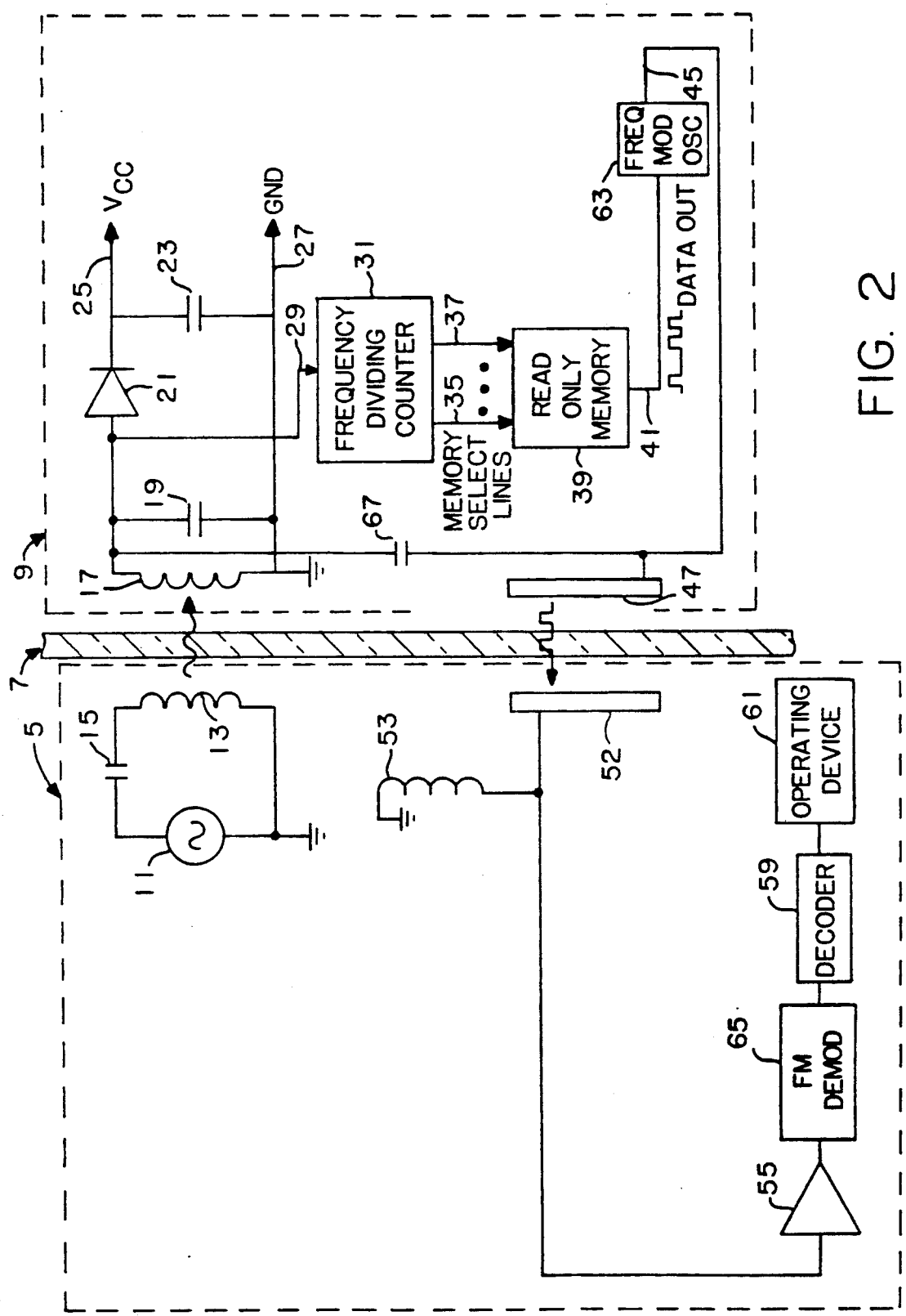
FIG. 2 is a block circuit diagram of a further embodiment of a proximity identification system according to the invention.

Referring now to FIG. 2, there is shown a further embodiment of a proximity identification system according to the present invention wherein, as in the following figures, like elements are provided with the same references numerals as in FIG. 1. The embodiment of FIG. 2 initially differs from the embodiment of FIG. 1 in that a frequency modulated oscillator 63 is substituted for the exclusive OR-gate 43 in the tag 9, and a frequency demodulator 65 replaces the phase detector 57 of FIG. 1 in the fixed installation 5. With the arrangement of FIG. 2, the frequency modulated oscillator 63 produces a signal on line 45 which has its frequency modulated in accordance with the data on line 41 read from the memory 39. As with the embodiment of FIG. 1, the oscillator 63 produces a carrier signal whose frequency is a submultiple, preferably one half, of the frequency of the transmitted exciter signal produced by the oscillator 11. It should be noted, however, that if desired, the phase modulation technique of FIG. 1, and in fact of any other of the modulation techniques disclosed in the above identified patent may be used with the system according to the present invention, although phase modulation, particularly bi-phase modulation, and FM modulation are preferred.

In addition to the above differences, according to the embodiment of FIG. 2, in order to provide electromagnetic transmission of the coded data signal from the tag 9 to the electromagnetic receiving coil 53 at the fixed installation, no additional transmitting coil or additional transmitting tank circuit is required or provided in the tag 9. Rather, as shown in FIG. 2, the output line 45 is connected to the electrostatic antenna 47 and, via a small capacitance 67, to the high side of the receiving coil 17. Capacitor 67 for a transmission frequency of 200 kHz typically has a value of 20 pf. A capacitor of this size is relatively small and can be easily integrated into the integrated circuit or chip provided in the tag 9. With the arrangement of FIG. 2, the electromagnetic receiving antenna coil 17 simultaneously functions as the electromagnetic transmitting coil antenna for the transmission of coded data to the receiving coil 53, with the tank circuit 17-19 operating in essentially the same manner as described above for the tank circuit 50-51 of FIG. 1.

Figure 3:
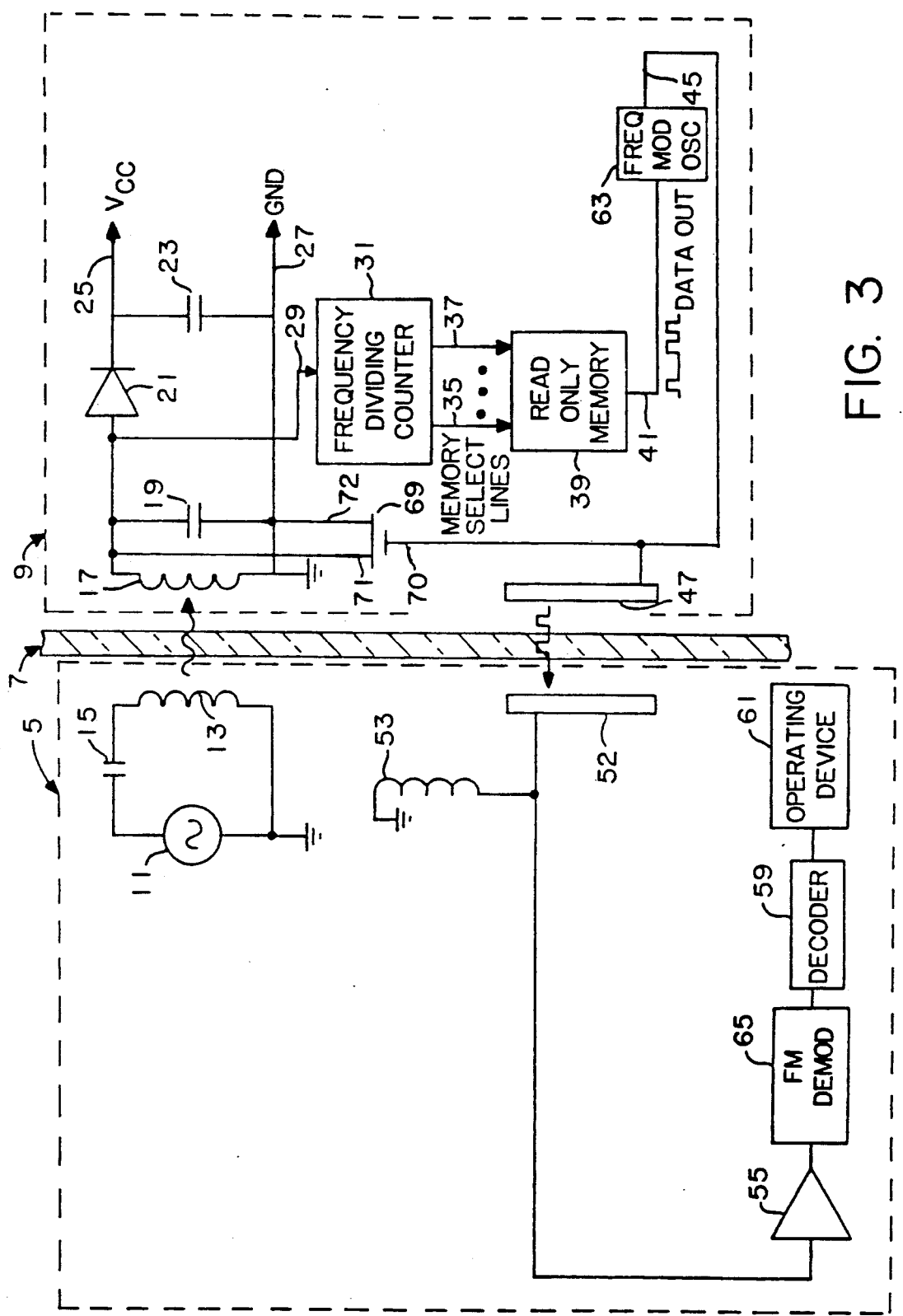
FIG. 3 is a block circuit diagram showing a modification of the embodiment of FIG. 2.

As indicated above with regard to FIG. 2, with the indicated operating frequencies, the capacitor 67 is sufficiently small so it can be easily integrated into the chip contained in the tag 9. However, for certain applications it is necessary to utilize lower operating frequencies which results in the requirement for larger capacitors 67 which by their nature become more difficult to realize in an integrated circuit. Thus, depending on the operating frequencies, it may become necessary to utilize an externally connected capacitor 67 in order to ensure proper operation of the circuit. Such an external capacitor is clearly not desirable since it would be most difficult to incorporate same in a portable unit or device 9 in the form of a card or tag. Accordingly, as shown in FIG. 3, the circuit of FIG. 2 may be modified in that the capacitive coupling between the electrostatic transmitting antenna 47 and the high side of the coil 1 is achieved by replacing the capacitor 67 with an MOS field effect transistor 69, for example, an N channel enhancement mode transistor, having its gate 70 connected to the electrostatic antenna 47, its drain 71 connected to the high side of the coil 17 and its source connected to ground, whereby the drain-source current path of the transistor 69 is connected in parallel with the coil 17. With this arrangement, the system shown in FIG. 3, will essentially operate in the same manner as that shown in FIG. 2.

Figure 4:
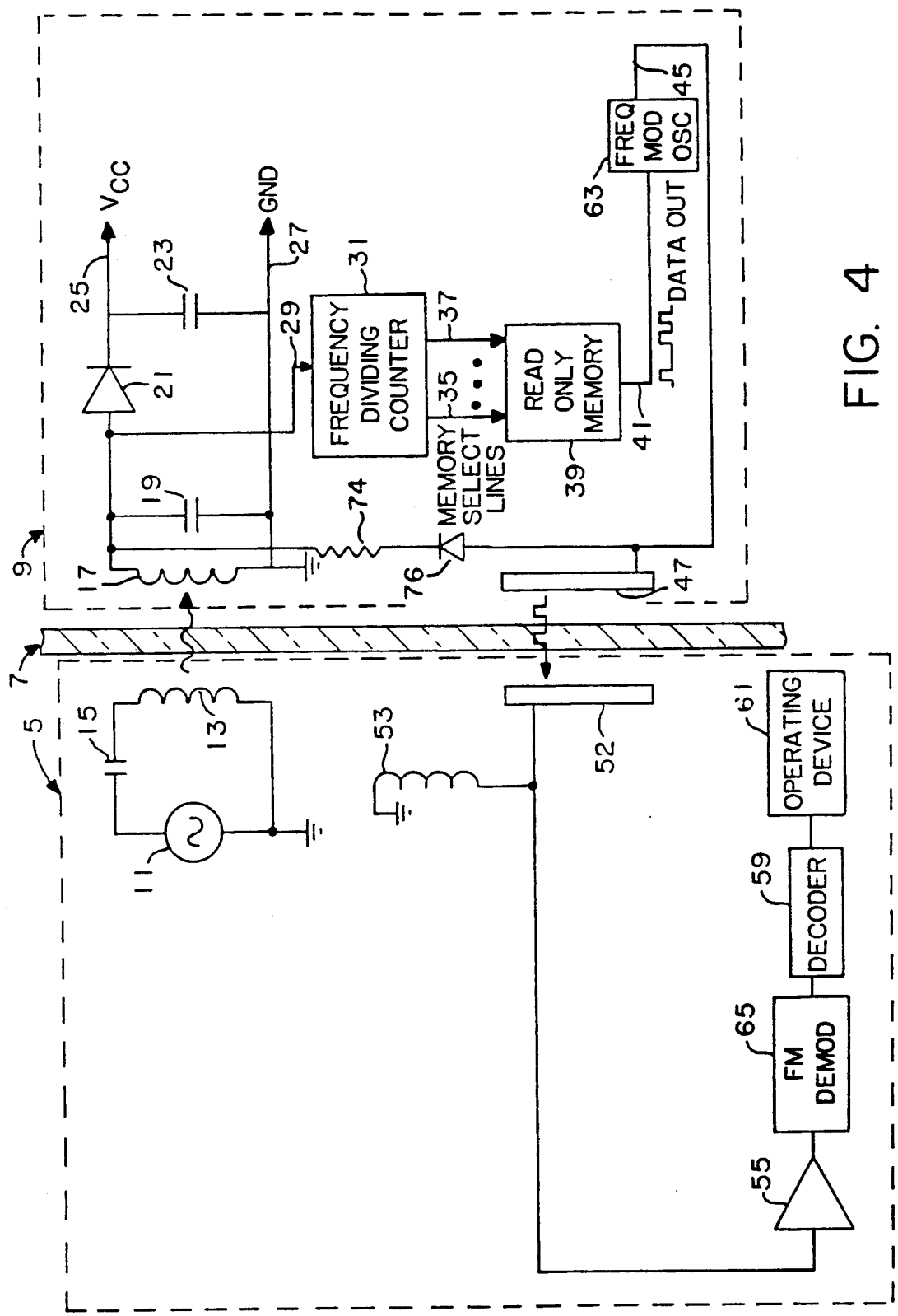
FIG. 4 is a block diagram showing a further modification of the embodiment of FIG. 2.

FIG. 4 shows a further modification wherein instead of using a capacitor 67 (FIG. 2) or a MOSFET 69 (FIG. 3) to couple the data output line 45, and its connected electrostatic antenna 47, to a high side of the coil 17, a series network of a resistor 74 and a diode 76 are used. Although the resistor 74 alone can be utilized, i.e., the diode 76 is eliminated, this will result in a loss of some range for the transmitted signal since clocking in both directions will be passed to the electromagnetic antenna coil 17, thus using more power. The use of the resistor 74 and preferably also the diode 76 as the coupling network has the advantage that this coupling network is even easier to integrate than the MOSFET 69 of FIG. 3.

Figure 5:
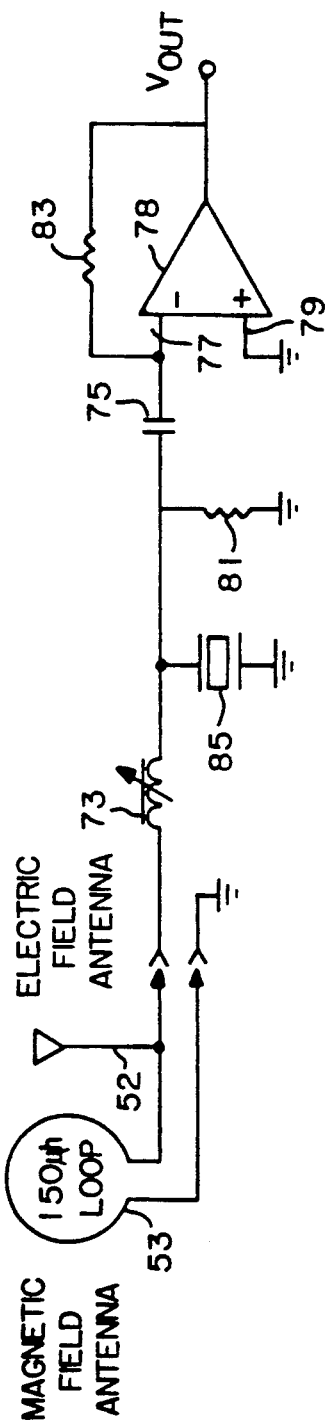
FIG. 5 is a circuit diagram of a preferred embodiment of a receiver preamplifier circuit for a proximity identification system according to the invention.

Turning now to FIG. 5, there is shown a preferred embodiment of the common preamplifier circuit 55 with its input circuit for effectively receiving both the magnetic and electric flux detected by the electromagnetic receiving antenna 53 and the electric field antenna 52. As shown in FIG. 5, the electromagnetic antenna or coil 53 has its high side connected in series with a variable inductance or tuning coil 73 and a capacitor 75 to the inverting input 77 of an operational amplifier 78 whose noninverting input 79 is connected to ground. The receiving coil or loop 53 may or may not be wound on a ferrite rod to increase the effective area of the antenna loop and/or the inductance in order to properly match same to the input electronics. The tuning coil 73 is adjusted so that the total inductance formed by the coil or loop 53 and the tuning coil 73 and the capacitance of capacitor 75 form a resonant circuit at a frequency corresponding to the center frequency of the received data, i.e. 200 kHz in the disclosed example. Typical values for this input circuit for this frequency would be, for example, 150 µh for the antenna coil 53, 130 µh (nominal) for the tuning coil 73 and 1800 pf for the capacitor 75. This tuned circuit looks like a low impedance path to current flow at the frequency of the data stream, and as a high impedance circuit to interfering type signals of a different frequency, for example the exciter frequency of 400 kHz, since this circuit is not resonant at such frequencies.

The bandwidth of the tuned resonant input circuit is set to a minimum value which allows adequate bandwidth by means of shunt resistor 81 connected between the common connection of the tuning coil 73 and the capacitor 75 and ground, which also sets the Q of the tuned circuit. A typical value for this shunt resistor 81 with the other values mentioned above would be 18 kΩ.

As shown in FIG. 5, the electric or electrostatic field antenna 52 is directly connected to the electromagnetic antenna coil 53. However, it should be noted that the electrostatic field antenna 52 could be connected, if desired, to the antenna coil 53 via the tuning coil 73, i.e. the antenna 52 could be connected to the common connection between the tuning coil 73 and the capacitor 75. In fact, this latter connection point may be desirable, if it is available in the circuit, since it constitutes the point of maximum impedance for the resonant input circuit. However, the point of attachment as shown is a relatively high impedance point as well, although its impedance has been stepped down by the ratio of the inductance of the tuning coil 73 to the total inductance of the coil 53 and 73. In any case, since the impedance is high at the attachment point of the electric field antenna 52, a sufficiently high voltage can be developed at the attachment point upon receipt of the signal by the antenna 52, with this voltage resulting in a circulating tank current which flows into the virtual ground at the input of the amplifier 78, after being multiplied by the Q of the tank circuit.

As further shown in FIG. 5, the amplifier 78 is provided with negative feedback by means of a resistor 83 connected between the output of the amplifier 78 and its inverting input 77 to form a transimpedance amplifier, with the transimpedance being equal to the value of the resistor 83. A typical value for this resistor 83 in the illustrated example would be 5.1 kΩ. With this arrangement, the amplifier 78 effectively is a high gain amplifier which multiplies the current at its input by the value of the feedback resistor 83 to provide its output voltage signal $V_{out}$.

In order to protect the input circuit against the strong exciter field which may be present at the antenna inputs, and in particular to prevent overloading of the active operational amplifier 78, as further shown in FIG. 5, a ceramic resonator 85 which acts as a notch filter for the exciter frequency, i.e. 400 kHz, is connected between the high side of the antenna and ground. It should be noted that although the notch filter is shown as a ceramic resonator 85, the notch filter can be realized by LC series resonant circuit or a crystal, with the important criteria being that it formed a very low impedance path to ground at the exciter frequency, while having negligible effect on the circuit operation at its connection point.

In summary, the common preamplifier circuit according to the invention, whose input is connected to both an electromagnetic antenna for receiving modulated data in the form of a magnetic field and to an electric field antenna for receiving modulated data in the form of an electric field, includes a filter and impedance transforming network for both the electrostatic and the electromagnetic field antennas with this network serving to reject out of band interferences as well as matching the antennas to the input of the amplifier 78. Moreover, the preamplifier circuit is preferably provided with a notch filter 85 to reject the exciter field, and the bandwidth of the tuned input circuit is preferably set to be wide enough to pass the modulated data stream unattenuated, but is sufficiently narrow so as to reject out of band interferences.

As indicated above, a number of different methods have been described and used to eliminate interference or interaction between the exciter field for the tag 9 and the data field transmitted from the tag 9. That is, initially the frequency used for the data transmission, e.g. 200 kHz, is a subharmonic of the exciter frequency, e.g. 400 kHz, resulting from the division by two in the circuitry of the tag 9, so that ideally there is zero energy in the exciter field at the transmission frequency. Moreover, the transmit and receive coils or antennas for data transmission are each tuned to the nominal operating frequency, which minimizes interference thereof from the transmit and receive coils for the exciter field. Additionally, the input circuit of the data receiver, and in particular the preamplifier circuit of FIG. 5, is provided with a notch filter to reject the higher frequency exciter field. In addition to these field isolation methods, another order of magnitude of isolation between the components of the lower frequency data transmission field and the higher frequency exciter field can be achieved by orienting the antenna loops or coils in the data transmission path orthogonally with respect to the antenna loops or coils for the exciter frequency transmitting and receiving antennas, so that, to a first approximation, none of the flux produced by the exciter antenna is coupled into the electromagnetic antennas for the data transmission. The orientation of the various antennas for the embodiments of FIGS. 1 and 2 are schematically shown in FIGS. 6 and 7, respectively.

Figure 6:
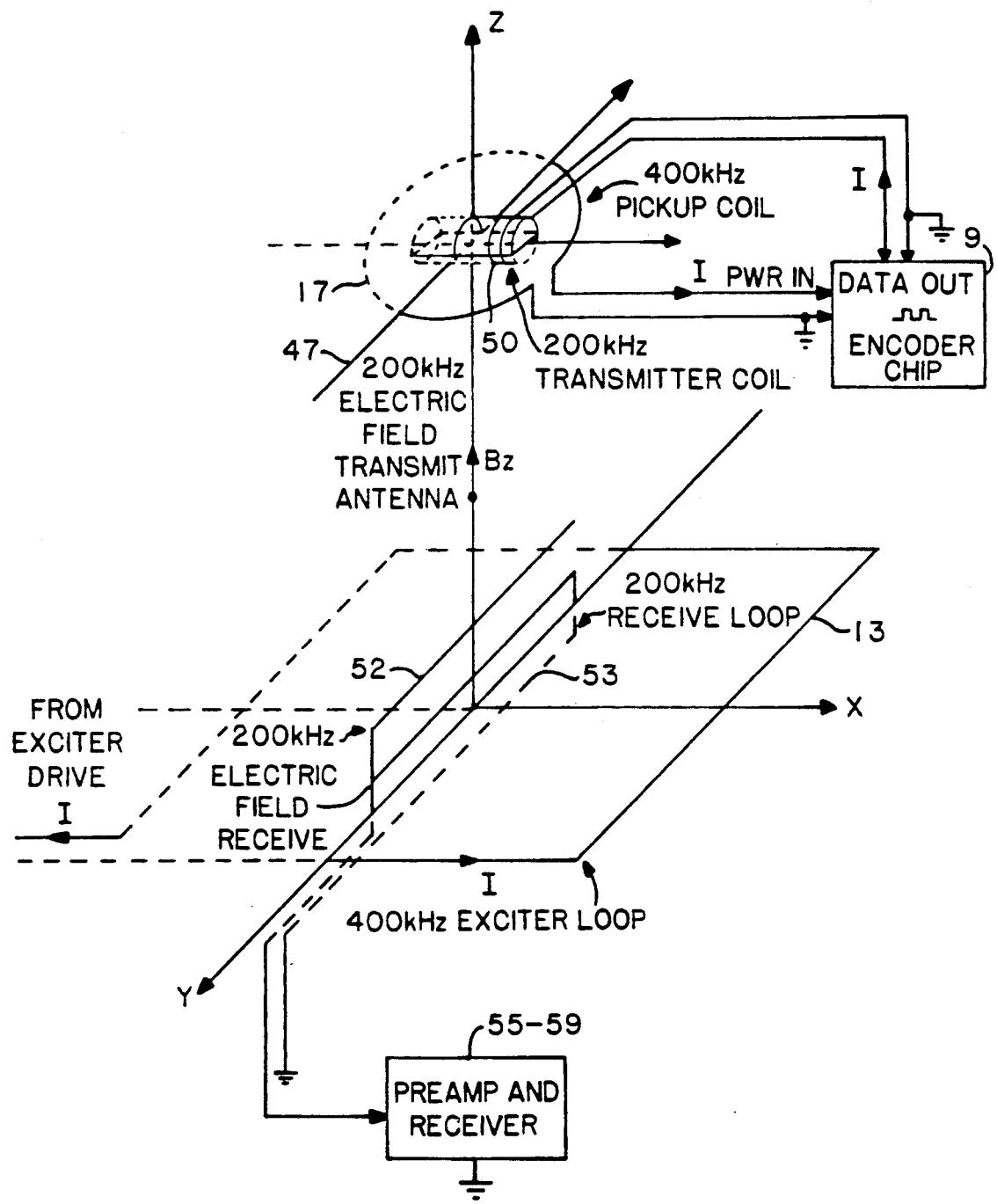
FIG. 6 is a schematic diagram illustrating the preferred arrangement for the orientation of the various antennas for a proximity identification system according to the embodiment of the invention shown in FIG. 1.

As can readily be seen from FIG. 6, the antenna coils 13 and 17 for the exciter frequency are oriented parallel to one another and orthogonal to the antenna coils 50 and 53 for the data transmission frequency which are likewise oriented parallel to one another. Moreover, as can be seen, the two electrostatic antennas 47 and 52 are likewise oriented parallel to one another in order to maximize the coupling. However, as can be seen from FIG. 7, wherein the antenna coil 17 for the tag 9 is used both as a receive or pickup coil for the exciter field 400 kHz and as a transmitter coil for the data field 200 kHz, the receiving antenna 53 for the 200 kHz field is oriented in the same plane as the exciter antenna 13 for the 400 kHz exciter field in order to maximize the desired coupling between the various coils. Both of the indicated arrangement contain various advantages and disadvantages depending upon the particular applications.

Figure 7:
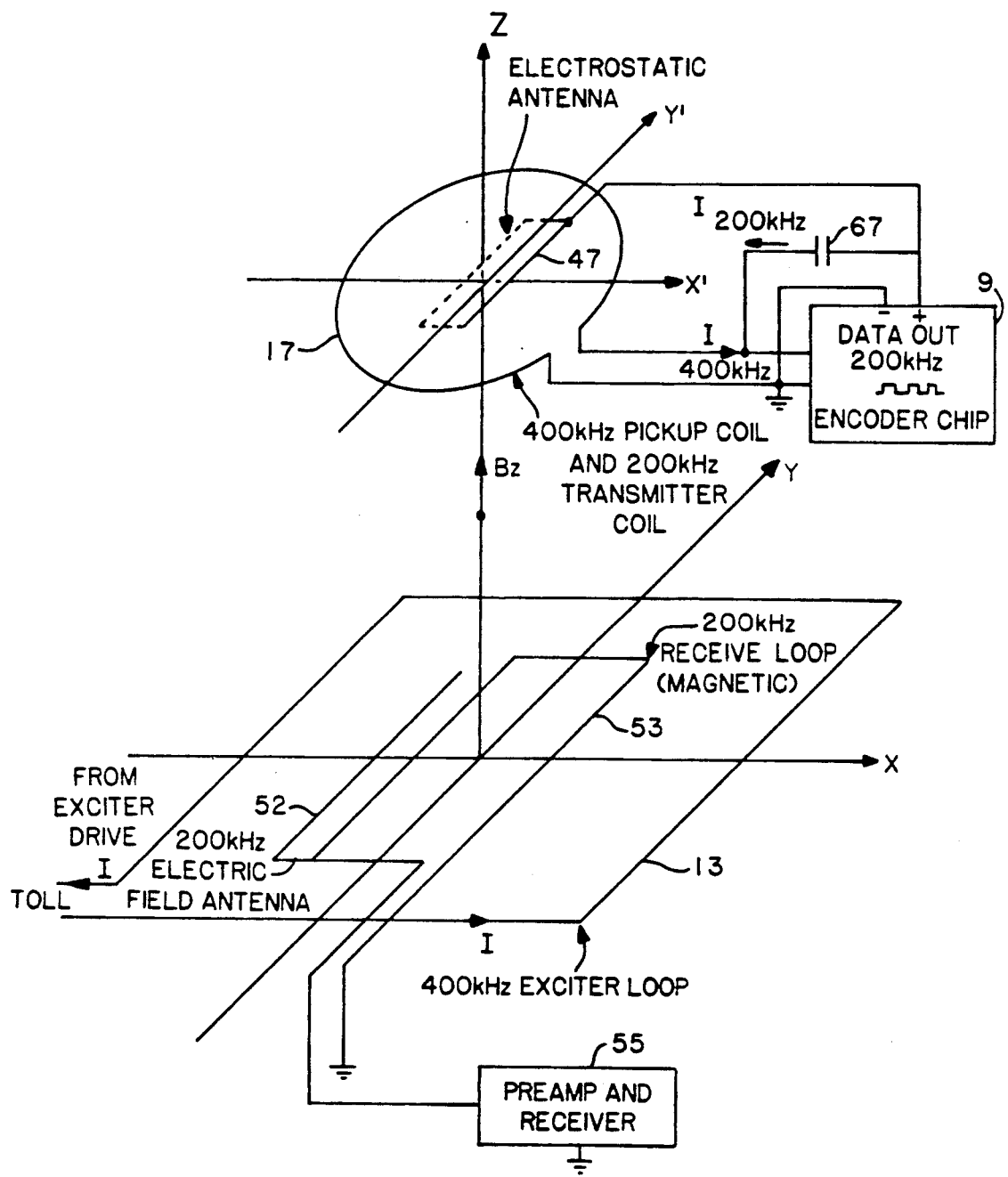
FIG. 7 is a schematic diagram illustrating the preferred arrangement for the orientation of the various antennas for the embodiments of the proximity identification system according to the invention shown in FIGS. 2 and 3.

The advantage of the arrangement shown in FIG. 7 is that a separate transmitting antenna for the data is not required within the tag 9, which is then much more cost effective and more easily integrated into a small tag or card. The disadvantage of this arrangement, however, is that the additional isolation between the different frequency components as a result of the orthogonal orientation of the respective antennas is not achieved. On the other hand, where size of the tag 9 and cost are not a concern, it would appear to be best to provide two separate electromagnetic coils or antennas in the tag 9 as shown for example in FIGS. 1 and 6. This latter arrangement results in a longer read range due to the improved isolation, with a good example of an application for this arrangement being vehicle identification wherein the tag 9 has no associated real size constraints.

The invention now being fully described, it will be apparent to one of ordinary skill in the art that changes and modifications can be made thereto without departing from the spirit or scope of the invention as set forth herein.

What is claimed:

1. A remotely powered batteryless portable device having circuitry for storing and transmitting coded information comprising:
   a memory in which coded information is stored;
   electromagnetic coupling means for receiving electromagnetic radiation of a first predetermined frequency;
   power means connected to said first coupling means for deriving power from the received signal for use by the circuitry in said portable device;
   circuit means, connected to said first coupling means and responsive to a received signal of said first predetermined frequency, for reading said coded information from said memory;
   means for generating a carrier signal of a second predetermined frequency;
   modulating means for modulating said carrier signal with the coded information read from said memory;
   electrostatic coupling means, connected to the output of said modulating means, for transmitting the modulated carrier signal via an electric field; and
   further means, connected to said output of said modulating means, for simultaneously causing said modulated carrier signal to be electromagnetically transmitted.

2. A portable device as defined in claim 1 wherein said further means comprises a further electromagnetic coupling means.

3. A portable device as defined in claim 2 wherein said electromagnetic coupling means comprises a resonant circuit, including a coil which serves as an antenna, which is tuned to said first predetermined frequency; said further electromagnetic coupling means comprises a further resonant circuit, including a further coil which serves as an antenna, which is tuned to said second predetermined frequency; and said electrostatic coupling means comprises an electric field antenna connected to the high side of said further coil.

4. A portable device as defined in claim 3 wherein said coil and said further coil are orthogonally disposed.

5. A portable device as defined in claim 1 wherein said further means comprises circuit means for connecting said output of said modulating means to said electromagnetic coupling means to cause said electromagnetic coupling means to electromagnetically transmit said modulated carrier wave.

6. A portable device as defined in claim 5 wherein: said electromagnetic coupling means is a resonant circuit, including a coil which serves as an antenna, which is tuned to said first frequency; said electrostatic coupling means is an electric field antenna; and said further means is a capacitor which is connected between said output of said modulating means and the high side of said coil.

7. A portable device as defined in claim 5 wherein: said electromagnetic coupling means is a resonant circuit, including a coil which serves as an antenna, which is tuned to said first frequency; said electrostatic coupling means is an electric field antenna; and said further means is an MOS transistor having its gate connected to said output of said modulating means and its source to drain current path connected in parallel with said coil.

8. A portable device as defined in claim 5 wherein: said electromagnetic coupling means is a resonant circuit, including a coil which serves as an antenna, which is tuned to said first frequency; said electrostatic coupling means is an electric field antenna; and said further means includes a resistor connected between said output of said modulating means and the high side of said coil.

9. A portable device as defined in claim 8 wherein said further means additionally includes a diode connected in series with said resistor.

10. A portable device as defined in claim 1 wherein said means for generating a carrier signal generates a carrier signal whose frequency is a sub-multiple of said first predetermined frequency.

11. A portable device as defined in claim 10 wherein said carrier signal frequency is equal to one half of said first predetermined frequency.

12. A portable device as defined in claim 11 wherein said means for generating said carrier frequency comprises a frequency divider connected to the output of said first coupling means.

13. A portable device as defined in claim 10 wherein said means for reading said memory and said means for generating a carrier signal are both realized by a frequency divider having a plurality of outputs connected to address lines of said memory and a further output connected to said means for modulating.

14. A portable device as defined in claim 13 wherein said means for modulating comprises a phase modulator.

15. A portable device as defined in claim 14 wherein said phase modulator comprises an exclusive OR-gate.

16. A system for exciting and receiving radiation transmitted by a portable device as defined in claim 1 comprising: means for transmitting electromagnetic radiation of said first frequency, and receiver means for detecting modulated electromagnetic an electrostatic radiation transmitted by said portable device and for demodulating same; and wherein said receiver means includes an electromagnetic radiation receiving antenna, an electric field receiving antenna, and a common preamplifier circuit means for detecting radiation received by said electromagnetic radiation and said electric field receiving antennas.

17. A system as defined in claim 16 wherein said electromagnetic radiation receiving antenna comprises an antenna coil having one end connected to ground; wherein said electric field receiving antenna comprises a length of wire connected to the other end of said antenna coil; and said preamplifier circuit means comprises: an operational amplifier having its output connected to its inverting input via a feedback resistance and its non-inverting input connected to ground to form a transimpedance amplifier; and a series connection of a tuning coil and a capacitance connected between said other end of said antenna coil and said inverting input of said operational amplifier, with said series connection of said tuning coil and said capacitance forming, with said antenna coil, a series resonant circuit at said second frequency, and matching the impedance of said antennas to the input impedance of said operational amplifier.

18. A system as defined in claim 17 wherein said electric field antenna is connected to said other end of said antenna coil via said tuning coil.

19. A system as defined in claim 17 further comprising filter means, connected to said other end of said antenna coil, for filtering out signals of said first frequency received by said electric field antenna and said electromagnetic radiation field antennas.

20. A system as defined in claim 19 wherein said filter means comprises means, connected in parallel with the series connection of said antenna coil and said tuning coil, for providing a low impedance path to ground for said first frequency.

21. A system as defined in claim 20 wherein said filter means is a ceramic resonator.

22. A system as defined in claim 19 wherein said second frequency is a subharmonic of said first frequency.

23. A portable device as defined in claim 1 wherein: said electromagnetic coupling means is a magnetic field coupling means for inductively receiving magnetic radiation of said first predetermined frequency; said second predetermined frequency is a low frequency; and said further means causes said modulated carrier signal to be transmitted by a magnetic field.

24. A portable device as defined in claim 23 wherein said further means comprises a further magnetic field coupling means.

25. A portable device as defined in claim 23 wherein said further means comprises circuit means for connecting said output of said modulating means to said magnetic field coupling means to cause said magnetic field coupling means to magnetically transmit said modulated carrier wave.

* * * * *